United States Patent [19]
Zappia

[11] 3,835,982
[45] Sept. 17, 1974

[54] MODULAR CONVEYOR STAND
[76] Inventor: Anthony T. Zappia, 7576 Ivywood Dr., Indianapolis, Ind. 46250
[22] Filed: July 2, 1973
[21] Appl. No.: 375,653

[52] U.S. Cl. ................................. 198/204, 198/85
[51] Int. Cl. ........................................... B65g 15/60
[58] Field of Search ..................... 198/204, 233, 85; 248/188.4

[56] References Cited
UNITED STATES PATENTS
2,200,116   5/1940   Maguire et al. ..................... 198/204
3,292,772   12/1966   Rice .................................... 198/204
3,491,873   1/1970   Fauth ................................. 198/204
3,508,642   4/1970   Standley et al. ..................... 198/204

Primary Examiner—Richard A. Schacher
Assistant Examiner—Jeffrey V. Nase
Attorney, Agent, or Firm—Hood & Coffey

[57] ABSTRACT

A conveyor stand and a conveyor system in which such stands are used to support an endless conveyor strand, together with other elements, all readily assemblable with such stands to produce, from a few kinds of stock parts, any one of a great variety of conveyor systems, the assembling being readily accomplished at the site of proposed use of the conveyor system.

10 Claims, 5 Drawing Figures

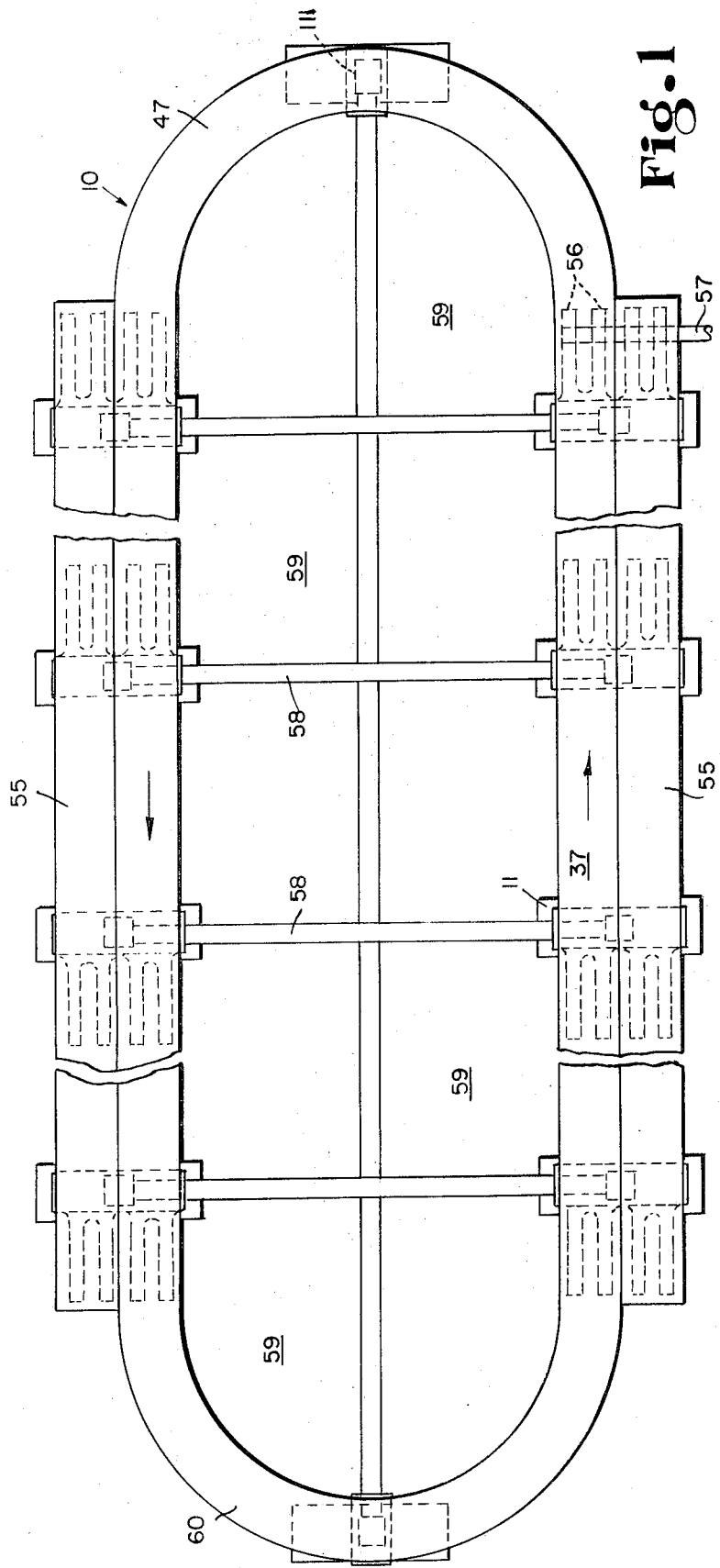
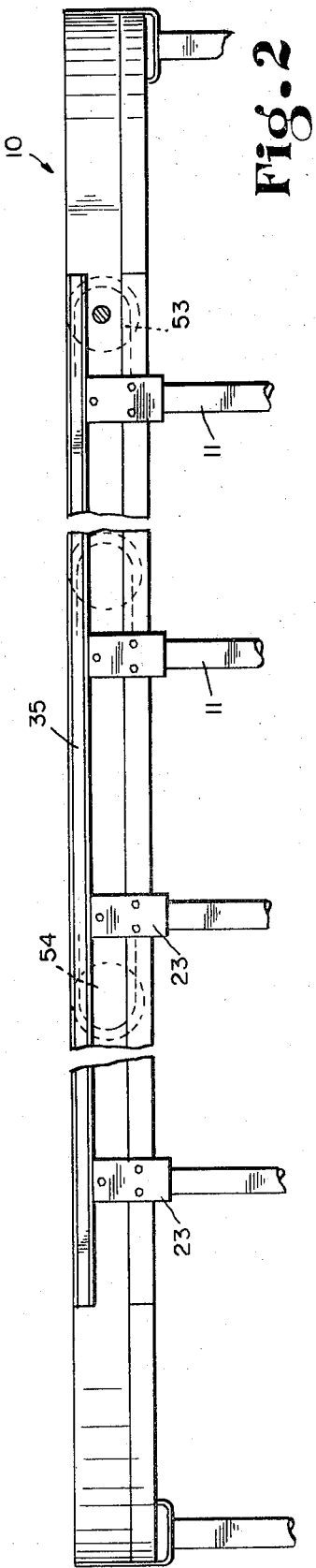

MODULAR CONVEYOR STAND

The present invention relates to modular conveyor stands and to conveyor systems in which such stands may find their primary utility. The invention is directed toward the provision of apparatus which may be purchased from an available inventory of only a few different pieces, the pieces being so designed that a sufficient number of them can be ordered and, when delivered, set up at the site of use to produce a conveyor system perfectly adapted for the work to be done.

Prior to my invention, conveyor systems have ordinarily been custom-purchased by specifying the use to which a conveyor is to be put, the distances between loading and unloading stations, the desired speed of travel, etc. Upon receipt of such an order, the conveyor manufacturer has customarily built the desired system, set it up and tested it on his own premises, and then sectionalized it for shipment to the customer. The various parts required are ordinarily manufactured specifically for the job so that the system followed prior to my invention has been time wasting and expensive.

According to the present invention, a manufacturer will carry in stock a suitable number of identical, but adjustable, parts so that, when he receives an order, he can fill it by selecting from stock a suitable number of the proper parts and delivering that collection of parts to the purchaser on the premises on which the conveyor is to be used. The purchaser can then assemble the conveyor system which is required to meet his wishes, right on the floor of the factory, and between the points, where it will be used.

An important factor in making such a procedure possible is the provision of a novel conveyor stand which can be manufactured in considerable quantities to one predetermined design, but which is sufficiently flexible in use that the single form of stand can be used, with judiciously-selected other parts, to produce conveyor systems in widely varying forms.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

In the drawings:

FIG. 1 is a plan view of one kind of conveyor system which can readily be constructed from stock parts;

FIG. 2 is a side elevation thereof;

Figure 3:
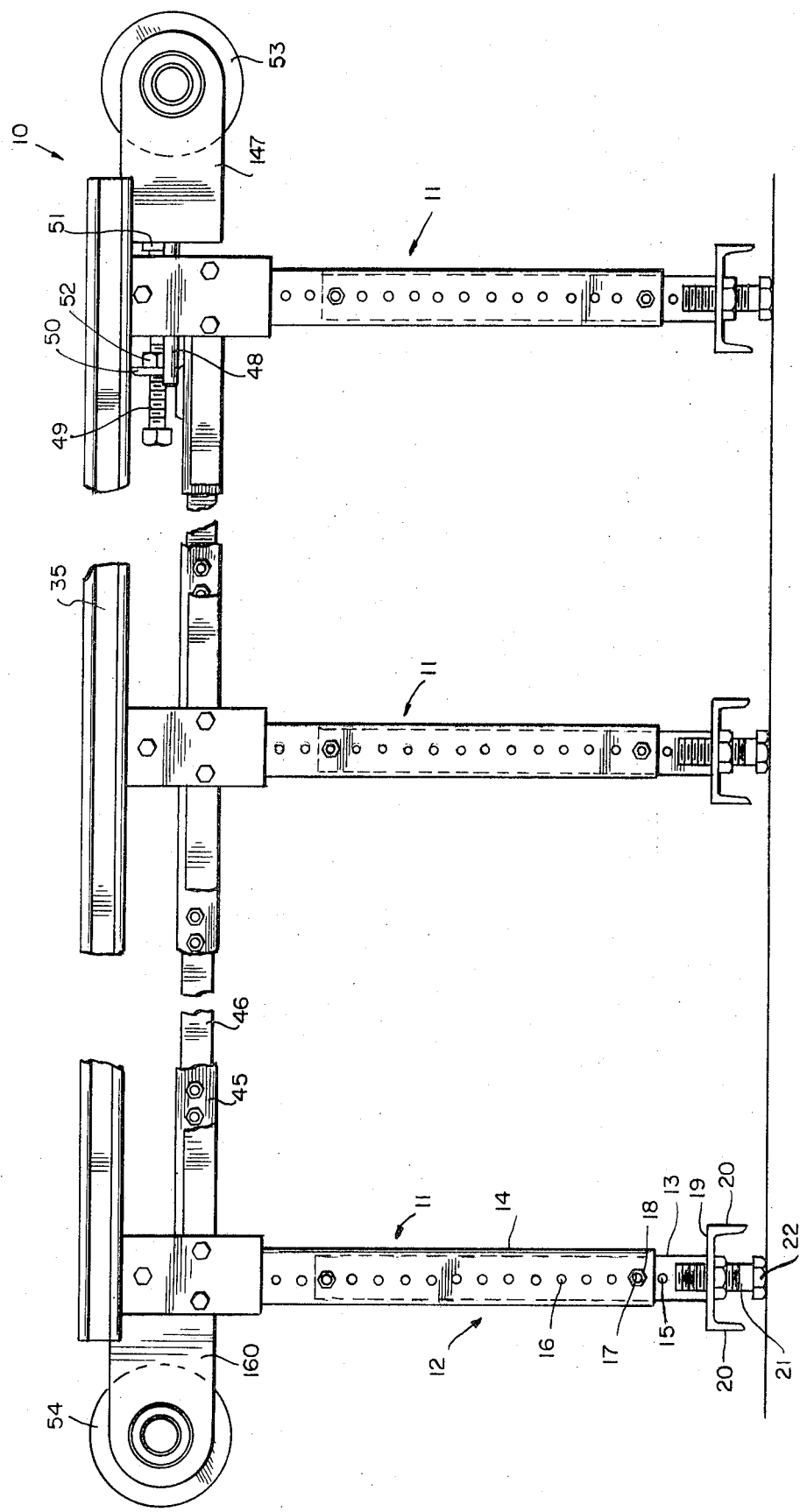
FIG. 3 is a side elevation of another conveyor system which can be constructed from parts identical with those used in the production of the system of FIG. 1, parts being broken away for clarity of illustration.

Referring more particularly to the drawings, the reference numeral 10 indicates generally an endless conveyor system supported by a plurality of spaced stands 11. Each such stand includes an extensible stem 12 comprising an inner member 13 and a telescopic outer member 14. The members 13 and 14 are provided, respectively, with vertically spaced perforations 15 and 16. Each series of perforations may be brought into registry with the other series in a plurality of adjusted positions, and I provide bolts 17 enterable in any registering pair of perforations and adapted to be secured in place by nuts 18, thus to adjust the length or height of each stem 12.

The inner member 13 of each stem is welded or otherwise suitably secured to a transversely extending base member 19 which may preferably be a channel having downturned flanges 20, 20. Near each end of each member 19, I form a threaded aperture for the reception of a bolt 21 whose head 22 extends below the corresponding flanges 20. Thus, the bolts 21 may be adjusted relative to the corresponding base member 19 to level the base member, regardless of possibly pitted or slanting condition of the floor upon which the stand is to be mounted.

Figure 5:
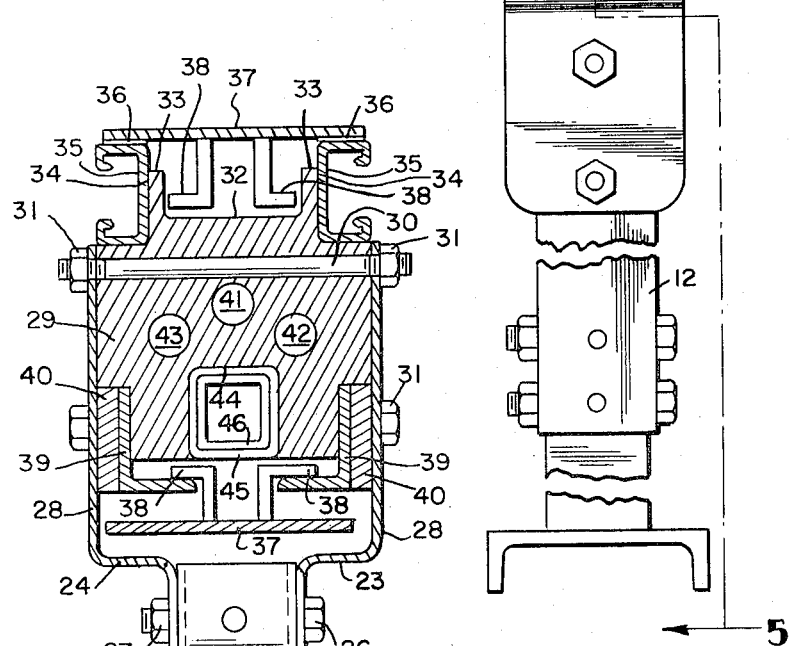
FIG. 5 is a section taken substantially on the line 5—5 of FIG. 4.

Referring to FIG. 5, each stand has associated with its upper end bracket means consisting of the members 23 and 24. The bases 25 and 25' of said bracket elements are secured flatly to the upper end of the stem 12 by suitable means such as the bolts 26 and their associated nuts 27.

The members 23 and 24 are formed to provide outwardly offset walls 28 between which is received a block 29. Tie bars 30 are inserted through holes in the walls 28 and a registering bore through the block 29 to receive nuts 31 on their opposite threaded ends.

The upper surface of the block 29 is formed to provide a channel 32 guarded by upstanding side flanges 33, 33, and the upper portion of the block is further formed with oppositely opening rabbets 34. A C-shaped rail 35 is received and suitably secured in each of said rabbets 34.

It will be clear that the upper surfaces 36 36 of the rails 35, 35 lie in a common plane to support the opposite edges of the working surface 37 of an endless-strand conveyor which may be of any well known character including a belt, flexibly-connected slats or a chain or chains supporting the surface 37.

Oppositely extending feet 38, 38 depend from the inner surface of the conveyor member 37 into the channel 32 whereby they tend to guide the conveyor strand by engagement with the flanges 33. These feet, however, do not touch the channel floor 32.

L-shaped members 39, 39 are suitably secured to the lower region of the block 29 and extend inwardly to serve as guides for the feet 38 of the return run of the endless conveyor strand. Preferably, shims 40 are inserted between the walls 28, 28 and the vertical portions of the members 39, 39.

Bores 41, 42 and 43 are formed through the block 29 in the direction of movement of the conveyor strand for a purpose which will appear.

A polygonal, longitudinally extending passageway 44 is formed to open through the bottom surface of the block 29. A correspondingly shaped tube 45 is suitably received and supported in the passageway 44. The tube 45 may be of any length up to the maximum length of the run of the conveyor strand and it serves to join and sustain the several stands 11 which support a run of the conveyor. As a general rule, the stands are uniformly separated by four to five feet; but if for any reason it is desired to space a stand differently in a series, or to add a stand at a point beyond one end of a previously cut tube 45, a similarly shaped but smaller tube 46 can be inserted in the raw end of the member 45, a short section of tube 45 may be inserted in the channel 44 of such additional stand and the protruding end of the smaller tube 46 can be telescopically entered in the short tubing 45 whereby the additional or differently-spaced stem can be connected into a system.

In constructing the kind of conveyor system illustrated in FIG. 1, a semicircular adaptor 47 may be used. This adaptor will be provided at each end with a pair of fingers 48 positioned and proportioned to enter the bores 42 and 43 of the stand 11 which is located at one end of the straight run of the conveyor strand 37. At each such end, a screw 49 is threadedly supported in a bracket 50, its distal end being provided with a swivel foot 51 to bear against the adjacent end of the adaptor. It may be desirable not to thread the bore through the bracket 50 but instead, to secure a nut 52 to said bracket to provide the threaded association of the screw 49 with the bracket.

Suitable sprockets, such as those indicated at 53 and 54, are distributed at intervals to drive, and to help to support, the conveyor strand. As indicated in FIG. 1, each stand 11, or selected stands, may carry linearly extending pairs of arms 56 bored to provide bearing means for a shaft 57 or the like, upon which may be mounted, for instance, the above-mentioned sprockets. If desired, and as shown in FIG. 1, a work tray, auxiliary conveyor or the like 55 may be supported from one or from each of the rails 35. In the form of system illustrated in FIG. 1, tie rods 58 extend between the corresponding stands for the parallel runs of the conveyor strand. Within the boundary of the endless strand 37, I may provide one or more accumulator tables 59 which may be either inactive or live.

Of course, in the form of invention illustrated in FIG. 1, a second adaptor 60 is associated with the opposite ends of the parallel runs of the conveyor in the same manner described in connection with the adaptor 47.

In this form of the invention, the strand 37 is flexible about an axis perpendicular to its carrying surface, so that there is no equivalent of the return run illustrated in FIG. 5.

Figure 4:
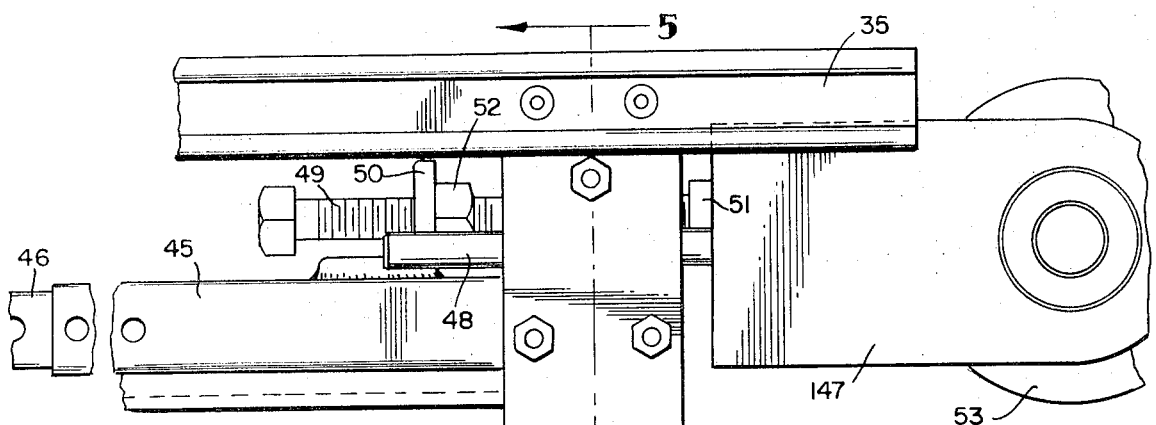
FIG. 4 is an enlarged fragmentary side elevation of the form of conveyor system illustrated in FIG. 3.

FIGS. 3, 4 and 5 illustrate a straight-run assembly in which adaptors 147 and 160 are associated with the blocks of the end stands to extend coaxially beyond the ends of the member 45 and to carry sprockets 53 and 54.

It will now be seen that, because the stand stems 12 with their associated blocks 29 are identical and proportioned and designed to cooperate with tubular members 45 of any desired length and since the provision of the elements 46 permits random separation between adjacent stands and permits addition of further units to extend the length of a conveyor system, since the arms 56 permit the addition of sprockets at desired locations and the blocks are so constructed as to permit almost infinite variations in assembly, I have provided structure whereby a manufacturer may maintain a significant stock of each of only a few kinds of elements and can, by judicious selection from that stock, supply to a customer the parts from which a conveyor system to meet almost any demand can be assembled by the customer at the point of use.

I claim:

1. A modular conveyor stand comprising a substantially vertical extensible stem, bracket means at the upper end of said stem, and block means stationarily seated in said bracket means, said block means being formed in its upper region to define a longitudinal guide channel flanked by opposite, longitudinally extending rabbets, and being formed in its lower region with a longitudinally-extending polygonal passageway.

2. The conveyor stand of claim 1 including an oppositely laterally extending base for said stem formed near each of its opposite extremities with a vertically-extending threaded aperture, and a headed screw threadedly penetrating each such aperture with its head exposed downwardly beneath said base.

3. The conveyor stand of claim 1 in which said block is further formed with a plurality of laterally-spaced, longitudinally-extending bores therethrough.

4. The conveyor stand of claim 1 including an outwardly-opening, C-shaped rail fixed in each of said rabbets.

5. The conveyor stand of claim 4 in which each of said rails provides an upwardly facing surface, said surfaces being disposed substantially in a common plane to support a portion of an endless conveyor member.

6. The conveyor stand of claim 1 including means depending from said block and providing opposite inwardly-extending flange means spaced below said block to support the inactive run of an endless conveyor member.

7. Conveyor means comprising a plurality of stands according to claim 1 arranged in transversely parallel alignment, longitudinally-adjustable means connecting said stands, and an endless conveyor strand movably supported from said stands.

8. The conveyor means of claim 7 in which said adjustable means comprises a first polygonal tube received in each said polygonal passageway and extending in at least one direction away from said block, and a second polygonal tube telescopically associated with the first polygonal tubes of at least two adjacent stands.

9. Conveyor means comprising a first plurality of stands according to claim 3 arranged in transversely parallel alignment, a first endless conveyor strand movably supported from said stands, a second plurality of stands according to claim 3 arranged in transversely parallel alignment and laterally spaced from, and parallel with said first plurality of stands, a second endless conveyor strand movably supported from said second plurality of stands, means for driving said strands at equal speeds in opposite directions, and a substantially semicircular trackway provided at each end with a plurality of fingers, the fingers at one end of said trackway being receivable in the bores of the block at one end of said first plurality of stands and the fingers at the other end of said trackway being receivable in the bores of the block at the corresponding end of said second plurality of stands.

10. The conveyor means of claim 9 including accumulator means disposed between said first plurality of stands and said second plurality of stands.

* * * * *